(12) United States Patent
Nakata

(10) Patent No.: US 7,493,034 B2
(45) Date of Patent: Feb. 17, 2009

(54) FOCUS DETECTION SYSTEM

(75) Inventor: Masahiro Nakata, Saitama (JP)

(73) Assignee: Hoya Corporation, Tokyo (JP)

( * ) Notice: Subject to any disclaimer, the term of this patent is extended or adjusted under 35 U.S.C. 154(b) by 498 days.

(21) Appl. No.: 11/268,569

(22) Filed: Nov. 8, 2005

(65) Prior Publication Data

US 2006/0104621 A1     May 18, 2006

(30) Foreign Application Priority Data

Nov. 18, 2004    (JP)  .............................. 2004-335184

(51) Int. Cl.
*G03B 13/36* (2006.01)
(52) U.S. Cl. .......................................... 396/96; 396/99
(58) Field of Classification Search .................... 396/96, 396/99; 348/230.1, 297–299, 345–356; 250/201.2–201.8
See application file for complete search history.

(56) References Cited

U.S. PATENT DOCUMENTS

| | | | |
|---|---|---|---|
| 4,618,235 A | * | 10/1986 | Ishida et al. .................. 396/96 |
| 6,115,553 A | * | 9/2000 | Iwamoto ..................... 396/104 |
| 6,198,506 B1 | | 3/2001 | Nakata et al. |
| 6,657,669 B1 | | 12/2003 | Sato et al. |
| 6,871,018 B2 | | 3/2005 | Nakata |
| 6,922,526 B2 | | 7/2005 | Nakata et al. |
| 6,937,818 B2 | | 8/2005 | Nakata et al. |
| 2004/0159769 A1 | | 8/2004 | Nakata et al. |

OTHER PUBLICATIONS

U.S. Appl. No. 11/224,026 to Nakata et al., filed Sep. 13, 2005.
U.S. Appl. No. 11/268,572 to Nakata, filed Nov. 8, 2005.

* cited by examiner

*Primary Examiner*—William B. Perkey
(74) *Attorney, Agent, or Firm*—Greenblum & Bernstein, P.L.C.

(57) ABSTRACT

A focus detection system includes a line sensor array wherein the line sensor array photoelectrically converts object light into an electric charge, and outputs the accumulated electric charge as an image signal; a monitor sensor array for monitoring an integral value of the line sensor array to output a monitor signal; a controller; and an amplifier. The controller detects the integral value of the line sensor array from the monitor signal, continues to make the line sensor array perform an integral operation until a secondary maximum integral time elapses if, upon a lapse of a predetermined primary maximum integral time, a value of the monitor signal needs to be amplified at an amplification factor greater than a maximum amplification factor of the amplifier, and increases the amplification factor of the amplifier after a lapse of the secondary maximum integral time.

19 Claims, 9 Drawing Sheets

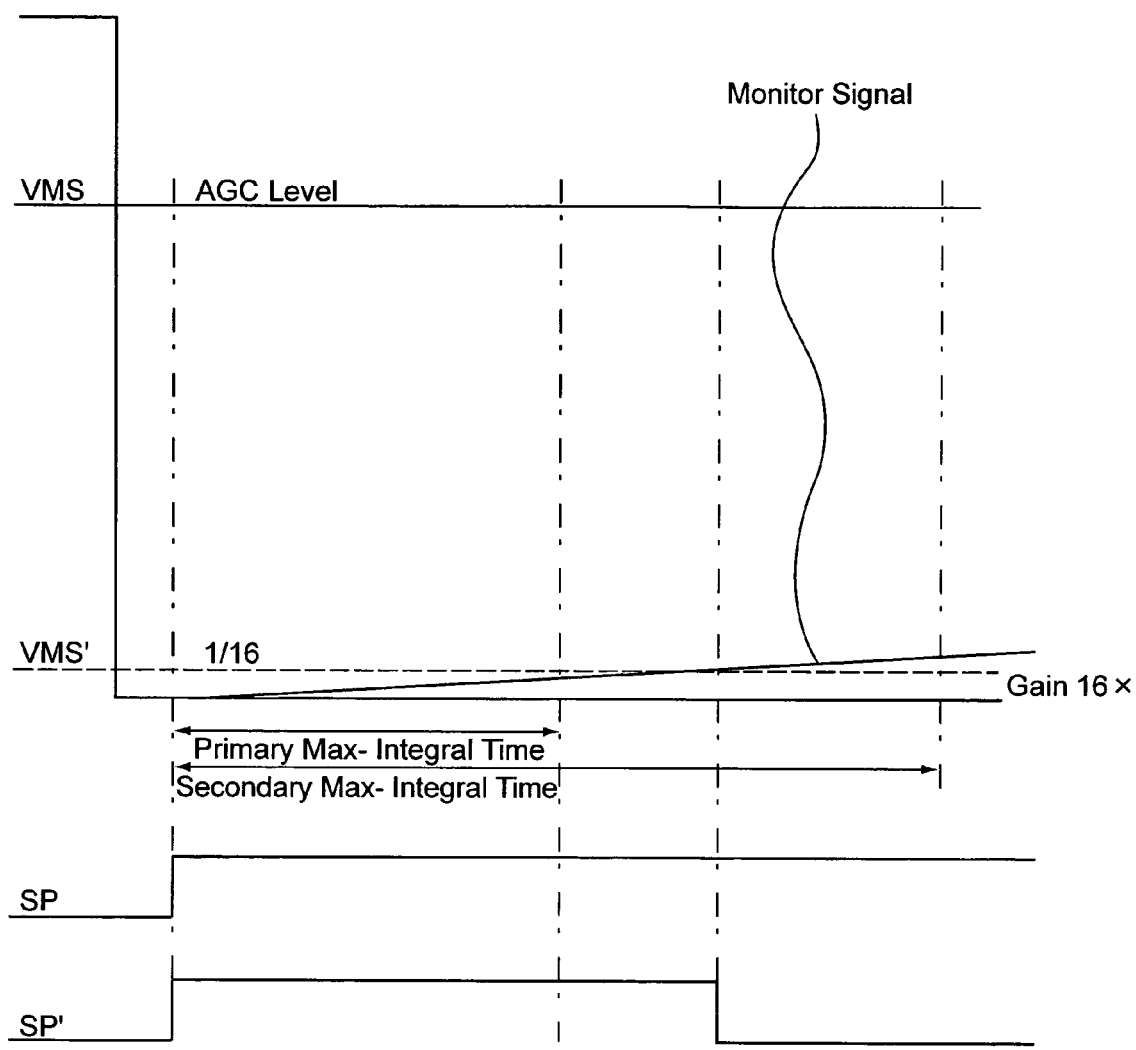

FOCUS DETECTION SYSTEM

BACKGROUND OF THE INVENTION

1. Field of the Invention

The present invention relates to a focus detection system which is incorporated in optical equipment such as an SLR camera.

2. Description of the Related Art

In a conventional phase difference type focus detection system incorporated in an SLR camera system to serve an autofocus (AF) system thereof, a pair of object images obtained by pupil division are projected onto a pair of areas on a line sensor (line sensor array) to be converted into a pair of electric charges (electrical signals) by the line sensor, and the pair of electric charges are converted as a pair of image signals, respectively. Thereafter, a phase difference between the pair of object images formed on the line sensor is determined according to the pair of image signals and a focus state (defocus amount) is determined based on the phase difference.

In the case where such a focus detection system is a multipoint focus detection system capable of focusing on a plurality of focus detection zones, a monitor sensor (monitor sensor array) is installed on each of a plurality of line sensors or each of a plurality of zones on each line sensor which respectively correspond to the plurality of focus detecting zones, and the integral operation terminating operation and control on an amplification factor (gain) for amplification of image signals are carried out in accordance with one of the plurality of monitor sensors which has received an object image the brightness of which is the greatest. This type of multipoint focus detection system is disclosed in, e.g., U.S. Pat. No. 6,198,506.

Conventionally, in dark conditions, the integral operation is completed after a lapse of a predetermined maximum integral time, and image signals are amplified by an amplifier. If image signals having an adequate level are not obtained because of a low object brightness, the integration termination value is reduced or the amplification factor of the amplifier is increased to perform the integral operation again.

Due to the tendency of the number of focus detection zones being increased and further miniaturization of an optical system of the autofocus (AF) system in recent years, the amount of light which illuminates the light receiving surface of each line sensor has in turn being getting lower, i.e., there has been a tendency for an object image projected onto each line sensor to become dark. Due to this tendency, the amplification factor of the amplifier needs to be increased to obtain an appropriate integral amount.

SUMMARY OF THE INVENTION

The present invention has been devised in view of the above described problems in conventional focus detection systems and provides a focus detection system in which the maximum integral time can be extended by detecting monitor signals output from the monitor sensor during integral operation of the line sensor.

According to an aspect of the present invention, a focus detection system is provided, including at least one line sensor array having a plurality of areas, each of which includes a plurality of pixels, wherein the line sensor array photoelectrically converts object light received by each of the plurality of pixels into an electric charge to accumulate the electric charge, and outputs the accumulated electric charge as an image signal; at least one monitor sensor array, positioned adjacent to the line sensor array, for monitoring an integral value of the line sensor array so as to output a monitor signal; a controller which terminates an integral operation of the line sensor array one of immediately after the monitor signal reaches a predetermined integration termination value and immediately after a lapse of a predetermined maximum integral time, whichever occurs first; and an amplifier which amplifies the image signal at an amplification factor determined in accordance with the monitor signal at the termination of the integral operation. The controller detects the integral value of the line sensor array from the monitor signal output from the monitor sensor array during a monitoring operation thereof, continues to make the line sensor array perform the integral operation until a secondary maximum integral time elapses in the case where the controller determines, upon a lapse of a predetermined primary maximum integral time, that a value of the monitor signal is necessary to be amplified at an amplification factor greater than a maximum amplification factor of the amplifier, and increases the amplification factor of the amplifier after a lapse of the secondary maximum integral time, the secondary maximum integral time being longer than the primary maximum integral time.

It is desirable for the secondary maximum integral time to include a time for compensating the amplification at the amplification factor which exceeds the maximum amplification factor.

After the lapse of the secondary maximum integral time, it is desirable for the controller to repeat a process of reducing the integration termination value in stages and increasing the amplification factor in stages while comparing the monitor signal with the termination value until one of the value of the monitor signal reaches the integration termination value and the amplification factor becomes the maximum amplification factor to which the amplifier can be set.

It is desirable for the controller to extend the maximum integral time to the secondary maximum integral time, which is longer than the primary maximum integral time, when determining that the value of the monitor signal is less than the predetermined integration termination value at a lapse of the primary maximum integral time.

The focus detection system can be incorporated in a camera to serve as a component of an autofocus system of the camera. The camera can be an SLR camera.

In an embodiment, a focus detection system is provided, including at least one line sensor array having a plurality of areas, each of which includes a plurality of pixels, wherein the line sensor array photoelectrically converts object light received by each of the plurality of pixels into an electric charge to accumulate the electric charge, and outputs the accumulated electric charge as an image signal; an amplifier which amplifies the image signal at a predetermined amplification factor; at least one monitor sensor array, positioned adjacent to the line sensor array, for monitoring an integral of the line sensor array so as to output a monitor signal; and a controller which terminates an integral operation of the line sensor array one of immediately after the monitor signal reaches a predetermined integration termination value and immediately after a lapse of a predetermined maximum integral time, whichever occurs first. In the case where the monitor signal has not reached the integration termination value upon even after a lapse of the maximum integral time, the controller repeats a process of reducing the integration termination value and increasing the amplification factor until the monitor signal reaches the integration termination value reduced by the process, and terminates the integral operation of the line sensor array when one of the value of the monitor signal reaches the integration termination value and the amplification factor becomes a maximum amplification factor.

It is desirable for the controller to increase the maximum integral time to a secondary maximum integral time when the value of the monitor signal upon the lapse of the maximum integral time has not yet reached a second integration termination value which is for darker conditions and is less than the integration termination value, and increases the amplification factor of the amplifier to the maximum amplification factor upon a lapse of the secondary maximum integral time.

It is desirable for the line sensor array and the monitor sensor array to be provided on each of a plurality of focus detection zones, and wherein the controller performs the operation on each of the monitor sensor arrays.

It is desirable for the monitor sensor array to output the monitor signal which is in proportion to the integration of the line sensor array, which is monitored by the monitor sensor array.

It is desirable for the focus detection system to include a switching device which selectively outputs the image signal and the monitor signal from a common output terminal, wherein the switching device outputs the monitor signal from the common output terminal one of immediately after all the monitor signals reach the integration termination value and immediately after a lapse of the maximum integral time, whichever occurs first.

In an embodiment, a focus detection system is provided, including at least one line sensor array having a plurality of areas, each of which includes a plurality of pixels, wherein the line sensor array photoelectrically converts object light received by each of the plurality of pixels into electric charge to accumulate the electric charge, and outputs the accumulated electric charge as an image signal; at least one monitor sensor array, positioned adjacent to the line sensor array, for monitoring an integral value of the line sensor array so as to output a monitor signal; a controller which terminates an integral operation of the line sensor array one of immediately after the monitor signal reaches a predetermined integration termination value and immediately after a lapse of a predetermined maximum integral time, whichever occurs first; and an amplifier which amplifies the image signal at an amplification factor determined in accordance with the monitor signal at the termination of the integral operation. The controller detects the integral value of the line sensor array from the monitor signal output from the monitor sensor array during a monitoring operation thereof. The controller increases the maximum integral time and changes the amplification factor of the amplifier to a maximum amplification factor thereof in the case wherein the controller determines that, upon a lapse of the maximum integral time, the value of the monitor signal is a value necessary to be amplified at an amplification factor greater than the maximum amplification factor.

It is desirable for the controller to compare the predetermined integration termination value with an integration termination value for dark conditions. The controller increases the maximum integral time and changes the amplification factor of the amplifier to the maximum amplification factor when determining that the value of the monitor signal has not yet reached the integration termination value for dark conditions upon the lapse of the maximum integral time.

According to the present invention, if an appropriate integral value cannot be obtained within the primary maximum integral time even if the gain (amplification factor) is raised to a maximum gain, the primary maximum integral time is extended to the secondary maximum integral time, so that an insufficient gain can be compensated for by an extension of the integral time of an integral operation.

An image signal having an a proper level can be obtained without performing the integral operation again because if the monitor signal has not reached the integration termination value even after a lapse of the maximum integral time, the controller repeats a process of reducing the integration termination value and increasing the amplification factor until the monitor signal reaches the integration termination value reduced by the process, and terminates the integral operation of the line sensor array when one of the value of the monitor signal reaches the integration termination value and the amplification factor becomes a maximum amplification factor.

The present disclosure relates to subject matter contained in Japanese Patent Application No. 2004-335184 (filed on Nov. 18, 2004) which is expressly incorporated herein by reference in its entirety.

BRIEF DESCRIPTION OF THE DRAWINGS

The present invention will be described below in detail with reference to the accompanying drawings in which:

FIG. 9 is a graph showing the relationship among the monitor signal, AGC level and gain in the second embodiment of the multipoint focus detection device.

DESCRIPTION OF THE PREFERRED EMBODIMENTS

Figure 1:
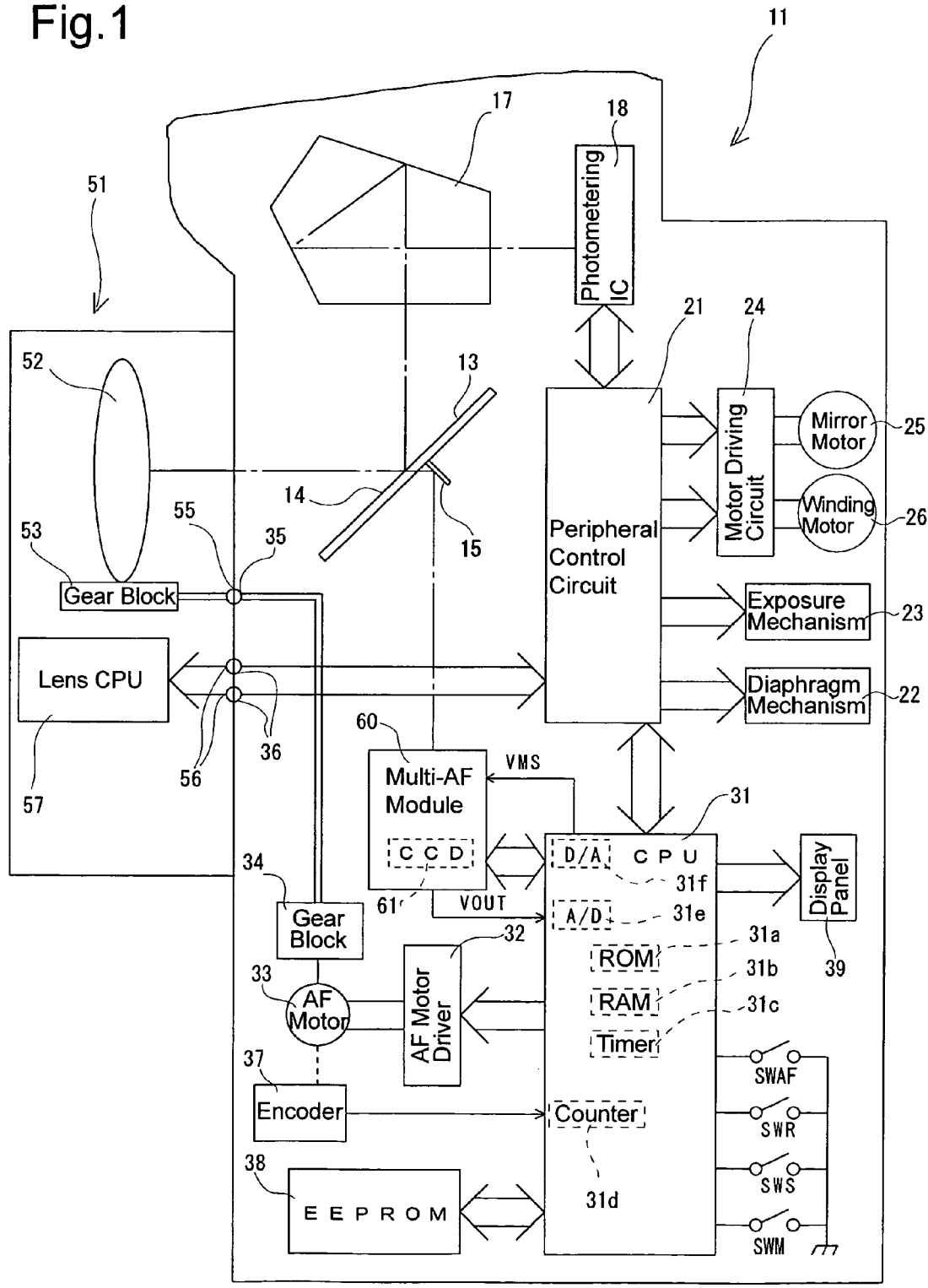
FIG. 1 is a schematic block diagram of elements of an embodiment of a single-lens reflex camera system according to the present invention.

FIG. 1 shows a block diagram of the main components of an AF single-lens reflex camera to which an embodiment of the present invention is applied. The AF single-lens reflex camera includes a camera body 11 having incorporated therein a multi-AF module (multipoint focus detection module) 60 with a CCD focus detection element 61, as a focus detection element, and an AF photographing lens 51 detachably attached to the camera body 11. The camera body 11 includes a body CPU (controller) 31 which generally controls the camera body 11 and the photographing lens 51, and which functions also as a selection device, a discrimination device, and a reliability judging device.

The photographing lens 51 is provided with a lens CPU 57 which controls the lens function. The camera body 11 includes a peripheral control circuit 21 which receives and transmits lens data and AF lens driving data, etc., from and to the lens CPU 57 provided in the photographing lens 51.

A large part of an object light bundle incident upon the camera body 11 from the photographing lens 51 is reflected by a main mirror 13 toward a pentagonal prism 17, which constitutes a finder optical system, is reflected by the pentagonal prism 17 and is emitted from an eyepiece (not shown). Part of the object light emitted from the pentagonal prism is incident upon a light receiving element of a photometering IC 18. The light bundle incident upon a half mirror 14 formed at the central portion of the main mirror 13 is transmitted through the half mirror 14 and is reflected downward toward the multi-AF module 60 via a sub-mirror 15 formed at the rear surface of the main mirror 13.

The photometering IC 18 converts the received light into electric signals corresponding to the quantity of light and outputs the electric signals, as the brightness signals, to the body CPU 31 through the peripheral control circuit 21. The body CPU 31 performs an exposure calculation, based on the brightness signal and the film sensitivity data, etc., and calculates an appropriate shutter speed and a diaphragm value for exposure. Upon a photographing operation, the peripheral control circuit 21 drives a mirror motor 25 through a motor drive circuit 24 to move the main mirror upward and drives the diaphragm mechanism 22 to thereby set the diaphragm (not shown) of the photographing lens 51 to the calculated diaphragm value, in accordance with the shutter speed and the diaphragm value obtained by the above-mentioned calculation. Consequently, the exposure mechanism (focal plane shutter) 23 is driven based on the calculated shutter speed to perform the exposure operation. After the exposure operation is completed, the peripheral control circuit 21 drives the mirror motor 25 to move the main mirror 13 downward and drives a film winding motor 26 to wind a film 1 by one frame.

The body CPU 31 includes a ROM 31$a$ in which control program, etc., is stored, a RAM 31$b$ in which data for calculation and control is temporarily stored, a timer 31$c$, a counter 31$d$, an A/D converter 31$e$ which A/D-converts the output signal VOUT (integration completion signal/video signal V) input from the multi-AF module 60 (CCD focus detection element 61) into digital signals, and a D/A converter 31$f$ which converts the monitor reference signal VMS into analogue signals and outputs the analogue signals. Furthermore, the body CPU 31 is connected to an EEPROM 38 which is an external nonvolatile memory device. The EEPROM 38 stores therein various constants inherent to the camera body 11.

The multi-AF module 60 uses a pupil division phase difference method for focus detection, and includes a CCD focus detection element 61 having a plurality of line sensor arrays, and an AF optical system (not shown), in which an object light bundle forming object images in a plurality of focus detection areas is pupil-divided into two light bundles on a focus detection surface equivalent to an image pickup surface and is projected onto the corresponding line sensor arrays.

The CCD focus detection element 61 is provided with the plurality of line sensor arrays which receive and integrate the pair of pupil-divided object light bundles, and a plurality of monitor sensor arrays each of which monitors the quantity of light received by a portion of the associated line sensor array, i.e., each monitor sensor array checks the integrated value. The operation of each line sensor array and each monitor sensor array is controlled by a control circuit of the CCD focus detection element 61. When the monitored voltage (output voltage) of one monitor sensor array reaches a predetermined AGC level, control circuit (of the CCD focus detection element 61) stops the integral operation of the line sensor array corresponding to the monitor sensor array. When the integral operations of all the line sensor arrays are completed, the charges obtained by the integral operation are successively converted into voltage as pixel units for each line sensor array and are output, into video signals V as pixel units, to the body CPU 31.

The body CPU 31 converts the video signals V input from the multi-AF module 60 into digital signals in the A/D converter 31$e$ incorporated in the body CPU 31, and performs a predetermined calculation (predicting calculation) based on the digital signals corresponding to the focus detection areas to obtain a defocus amount. The rotational direction of the AF motor 33 is determined based on the calculated defocus amount. The number of revolutions of an AF motor is determined based on the number of AF pulses output from an encoder 37 and this number is set in the counter 31$d$ incorporated in the body CPU 31. The body CPU 31 drives the AF motor 33 via an AF motor driver 32, based on the direction and the number of pulses. When the AF motor 33 is driven, the body CPU 31 counts down the number of pulses output from the encoder 37 in association with the rotation of the AF motor 33, using a built-in counter 35$d$. When the counted value becomes zero, the AF motor 33 is stopped.

The rotation of the AF motor 33 is reduced by a gear block 34 and is transmitted to the photographing lens 51 through the connection between a joint 35 provided on the body mount of the camera body 11 and a lens joint 55 provided on the lens mount of the photographing lens 51.

A focus switch SWAF which is adapted to switch the focus mode between a manual mode and an AF mode (one shot/continuous AF mode), a photometering switch SWS which is turned ON when a manual release button is depressed by half step, a release switch which is turned On when the manual release button is depressed by full step, and a main switch SWM for controlling the power supply to the peripheral control circuit 21, are connected to the body CPU 31.

The body CPU 31 indicates the current mode such as an AF mode, an exposure mode or a photographing mode, the shutter speed, and the diaphragm value, etc., in a display panel 39. The display panel 39 includes indicators usually provided on the outer surface of the camera body 11 and the field of view finder.

The photographing lens 51 includes the lens CPU 57, a gear block 53 to move a focusing lens 52 in the axial direction, and the lens joint 55 which is provided on the lens mount of the photographing lens 51 and which is disconnectably connected to the body joint 35 of the camera body 11. The rotation of the AF motor 33 is transmitted to the gear block 53 through the gear block 34, the body joint 35 and the lens joint 55, so that a focusing lens group 52 of the photographing lens 51 can be moved through the gear block 53.

The lens CPU 57 is connected to the peripheral control circuit 21 of the camera body 11 through connection between the groups of electrical contacts 56 and 36, so that predetermined data communication can be carried out to transmit and receive information regarding full aperture, the maximum F value, focal length, and the lens position (object distance).

Figure 2:
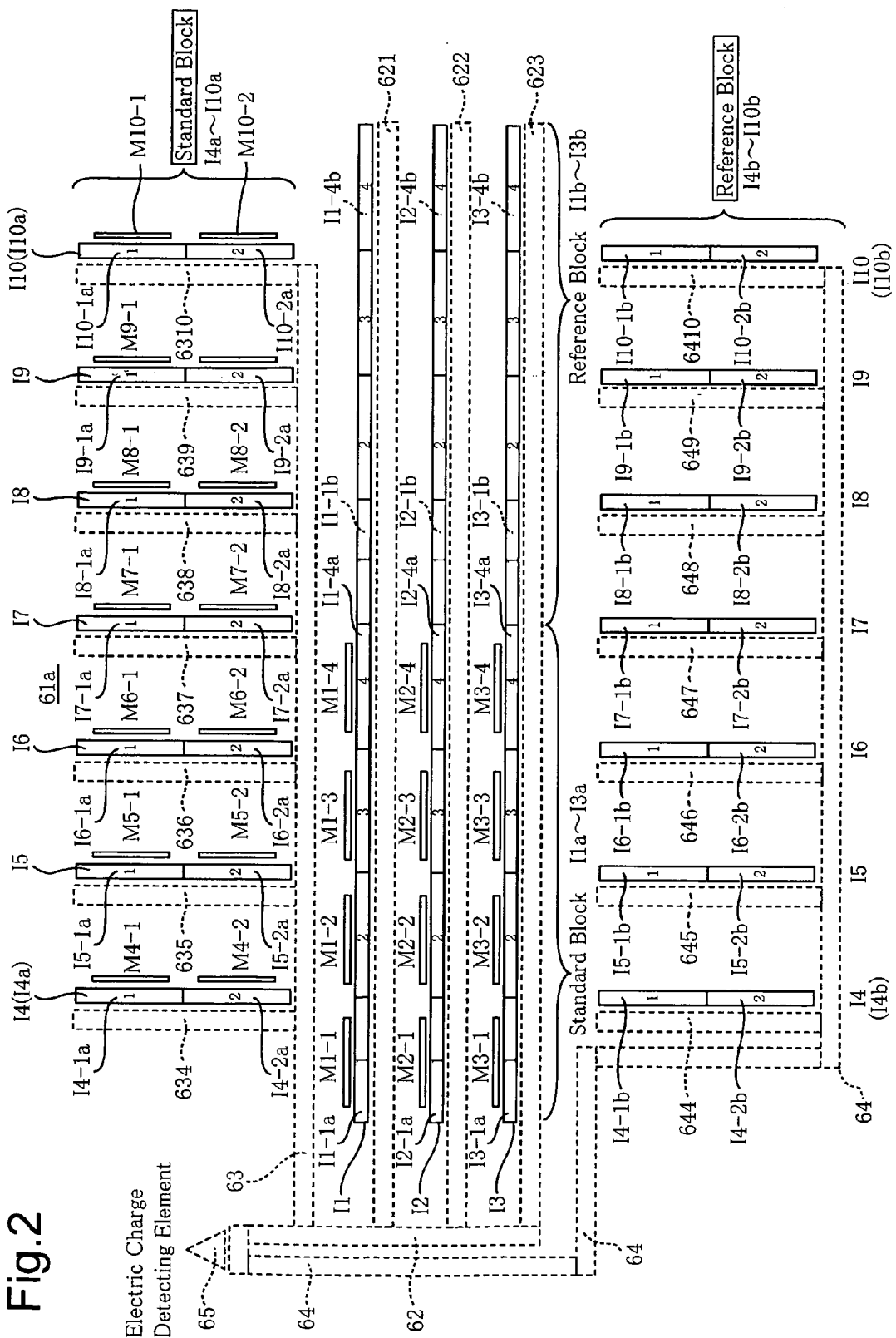
FIG. 2 is a diagrammatic sketch of an embodiment of a multipoint focus detecting device which is incorporated in a camera body of the single-lens reflex camera system shown in FIG. 1.

The structure of the CCD focus detection element 61 that is provided in the multi-AF module 60 incorporated in the camera body 11 will be hereinafter discussed in detail with reference to FIG. 2. FIG. 2 is a diagram showing an embodiment of an arrangement of line sensor arrays I and monitor sensor arrays M on board of a light receiving surface 61$a$ of the CCD focus detection element 61. In the illustrated embodiment, the CCD focus detection element 61 is provided with a single circuit board 80 (see FIG. 3) on which the line sensor arrays I and the monitor sensor arrays M are mounted, and a control circuit 71 for controlling the operations of the line sensor arrays I and the monitor sensor arrays M is mounted on the circuit board 80.

The CCD focus detection element 61 is provided, on the light receiving surface 61*a* thereof in a vertical center portion thereof, with three rows of horizontal line sensor arrays I1, I2 and I3 which are arranged at regular intervals in the vertical direction and are parallel to one another. The CCD focus detection element 61 is further provided on both vertical sides of the three rows of horizontal line sensor arrays I1, I2 and I3, with two sets of seven columns of vertical line sensors I4, I5, I6, I7, I8, I9 and I10 which are arranged at regular intervals in the horizontal direction to be parallel to one another. The line sensors I1 through I10 are CCD line sensors; each line sensor includes a large number of light receiving elements (photoreceivers) arranged in the elongated direction of the line sensor.

In the three rows of horizontal line sensor arrays I1, I2 and I3, a left half of the three rows of horizontal line sensor arrays I1, I2 and I3, from the center of the light receiving surface 61*a*, is determined as a standard block (which consists of standard line sensor arrays I1*a* through I3*a*) while a right half of the three rows of horizontal line sensor arrays I1, I2 and I3 is determined as a reference block (which consists of reference line sensor arrays I1*b* through I3*b*).

In the horizontal line sensor array I1, the standard line sensor array I1*a* is determined as four standard areas I1-1*a* through I1-4*a* and the reference line sensor array I1*b* is determined as four reference areas I1-1*b* through I1-4*b*. Likewise, in the horizontal line sensor array I2, the standard line sensor array I2*a* is determined as four standard areas I2-1*a* through I2-4*a* and the reference line sensor array I2*b* is determined as four reference areas I2-1*b* through I2-4*b*. Likewise, in the horizontal line sensor array I3, the standard line sensor array I3*a* is determined as four standard areas I3-1*a* through I3-4*a* and the reference line sensor array I3*b* is determined as four reference areas I3-1*b* through I3-4*b*.

The monitor sensor arrays M include four monitor sensor arrays M1-1 through M1-4, four monitor sensor arrays M2-1 through M2-4 and four monitor sensor arrays M3-1 through M3-4 which are arranged adjacent to the four standard areas I1-1*a* through I1-4*a*, the four standard areas I2-1*a* through I2-4*a* and the four standard areas I3-1*a* through I3-4*a*, respectively.

The twelve monitor sensor arrays M1-1 through M1-4, M2-1 through M2-4 and M3-1 through M3-4 operate independently of one another to monitor the amounts of light received by the adjacent twelve standard areas I1-1*a* through I1-4*a*, I2-1*a* through I2-4*a*, and I3-1*a* through I3-4*a*, respectively.

The seven vertical line sensor arrays I4, I5, I6, I7, I8, I9 and I10 which are positioned above the three rows of horizontal line sensor arrays I1, I2 and I3 as viewed in FIG. 2 are determined as a standard block (which consists of seven standard line sensor arrays I4*a*, I5*a*, I6*a*, I7*a*, I8*a*, I9*a* and I10*a*), and the other seven vertical line sensor arrays I4, I5, I6, I7, I8, I9 and I10 which are positioned below the three rows of horizontal line sensor arrays I1, I2 and I3 as viewed in FIG. 2 are determined as a reference block (which consists of seven standard line sensor arrays I4*b*, I5*b*, I6*b*, I7*b*, I8*b*, I9*b* and I10*b*).

The seven vertical line sensor arrays I4, I5, I6, I7, I8, I9 and I10 of the standard block are each divided into two in the elongated direction (vertical direction as viewed in FIG. 2) to be determined as a pair of standard areas I4-1*a* and I4-2*a*, a pair of standard areas I5-1*a* and I5-2*a*, a pair of standard areas I6-1*a* and I6-2*a*, a pair of standard areas I7-1*a* and I7-2*a*, a pair of standard areas I8-1*a* and I8-2*a*, a pair of standard areas I9-1*a* and I9-2*a* and a pair of standard areas I10-1*a* and I10-2*a*, respectively. Likewise, the seven vertical line sensor arrays I4, I5, I6, I7, I8, I9 and I10 of the reference block are each divided into two in the elongated direction (vertical direction as viewed in FIG. 2) to be determined as a pair of standard areas I4-1*b* and I4-2*b*, a pair of standard areas I5-1*b* and I5-2*b*, a pair of standard areas I6-1*b* and I6-2*b*, a pair of standard areas I7-1*b* and I7-2*b*, a pair of standard areas I8-1*b* and I8-2*b*, a pair of standard areas I9-1*b* and I9-2*b* and a pair of standard areas I10-1*b* and I10-2*b*, respectively. The monitor sensor arrays M further include seven pairs of monitor sensor arrays: a pair of monitor sensor arrays M4-1 and M4-2, a pair of monitor sensor arrays M5-1 and M5-2, a pair of monitor sensor arrays M6-1 and M6-2, a pair of monitor sensor arrays M7-1 and M7-2, a pair of monitor sensor arrays M8-1 and M8-2, a pair of monitor sensor arrays M9-1 and M9-2 and a pair of monitor sensor arrays M10-1 and M10-2 which are arranged to be adjacent to the pair of standard areas I4-1*a* and I4-2*a*, the pair of standard areas I5-1*a* and I5-2*a*, the pair of standard areas I6-1*a* and I6-2*a*, the pair of standard areas I7-1*a* and I7-2*a*, the pair of standard areas I8-1*a* and I8-2*a*, the pair of standard areas I9-1*a* and I9-2*a* and the pair of standard areas I10-1*a* and I10-2*a* of the standard block, respectively.

The fourteen monitor sensor arrays M4-1, M4-2, M5-1, M5-2, M6-1, M6-2, M7-1, M7-2, M8-1, M8-2, M9-1, M9-2, M10-1 and M10-2 operate independently of one another to monitor the amounts of light received by the adjacent fourteen twelve standard areas I4*a*-1*a*, I4*a*-2*a*, I5*a*-1*a*, I5*a*-2*a*, I6*a*-1*a*, I6*a*-2*a*, I7*a*-1*a*, I7*a*-2*a*, I8*a*-1*a*, I8*a*-2*a*, I9*a*-1*a*, I9*a*-2*a*, I10*a*-1*a* and I10*a*-2*a*, respectively.

In each of the line sensor arrays I1 through I10 that are structured as described above, the standard line sensor array (I1*a*, I2*a*, I3*a*, I4*a*, I5*a*, I6*a*, I7*a*, I8*a*, I9*a* or I10*a*) receives one of a pair of object images which are obtained by pupil division on the corresponding one of a plurality of focus detection zones, while the reference line sensor array (I1*b*, I2*b*, I3*b*, I4*b*, I5*b*, I6*b*, I7*b*, I8*b*, I9*b* or I10*b*) receives the other of the same pair of object images.

The CCD focus detection element 61 is further provided with a plurality of shift resisters (transfer devices): three shift resisters 62 through 64, three shift resisters 621 through 623, seven shift resisters 634 through 6310 and seven shift resisters 644 through 6410. More specifically, the shift resister 621 is positioned on the opposite side of the line sensor array I1 from the four monitor sensor arrays M1-1 through M1-4 to be adjacent and parallel to the line sensor array I1, the shift resister 622 is positioned on the opposite side of the line sensor array I2 from the four monitor sensor arrays M2-1 through M2-4 to be adjacent and parallel to the line sensor array I2, and the shift resister 623 is positioned on the opposite side of the line sensor array I3 from the four monitor sensor arrays M3-1 through M3-4 to be adjacent and parallel to the line sensor array I3. Likewise, each of the seven shift resisters 634 through 6310 is positioned on the opposite side of the associated one of the seven line sensor arrays I4 through I10 of the standard block from the associated pair of monitor sensor arrays (M4-1 and M4-2, M5-1 and M5-2, M6-1 and M6-2, M7-1 and M7-2, M8-1 and M8-2, M9-1 and M9-2, or M10-1 and M10-2) to be adjacent and parallel to the associated line sensor array. Each of the seven shift resisters 644 through 6410 is positioned on the left side (as viewed in FIG. 2) of the associated one of the seven line sensor arrays I4 through I10 of the reference block to be adjacent and parallel to the associated line sensor array. The three shift resisters 621 through 623 are connected to the shift resister 62, the seven shift resisters 634 through 6310 are connected to the shift resister 63, and the seven shift resisters 644 through 6410 are connected to the shift resister 64. Each light receiving element of each line sensor array I1, I2, I3, I4, I5, I6, I7, I8, I9 and I10 is provided with a photodiode and an ST (storage) portion (not shown) which stores integrated electric charges, into which the photodiode converts from the received object light, in units of light receiving elements upon the completion of the integral operation of the photodiode.

Immediately after the integral operations of all the line sensor arrays I1 through I10 are completed, the electric charges stored in the ST portions thereof are sequentially read out from an electric charge detecting element 65 (see FIG. 2) via the shift resisters 62, 63 and 64. The shift resister 62 is directly connected to the electric charge detecting element 65. The shift resister 64 is directly connected to the electric charge detecting element 65. The shift resister 63 joins the shift resister 62 to be connected to the electric charge detecting element 65 via the shift resister 62.

In the present embodiment of the CCD focus detection element 61, electric charges obtained by the standard line sensor arrays I4a, I5a, I6a, I7a, I8a, I9a and I10a of the seven vertical line sensor arrays I4, I5, I6, I7, I8, I9 and I10 of the standard block are transferred to the electric charge detecting element 65 via the shift resister 63, while electric charges obtained by the standard line sensor arrays I4b, I5b, I6b, I7b, I8b, I9b and I10b of the seven vertical line sensor arrays I4, I5, I6, I7, I8, I9 and I10 of the reference block are transferred to the electric charge detecting element 65 via the shift resister 64.

Figure 3:
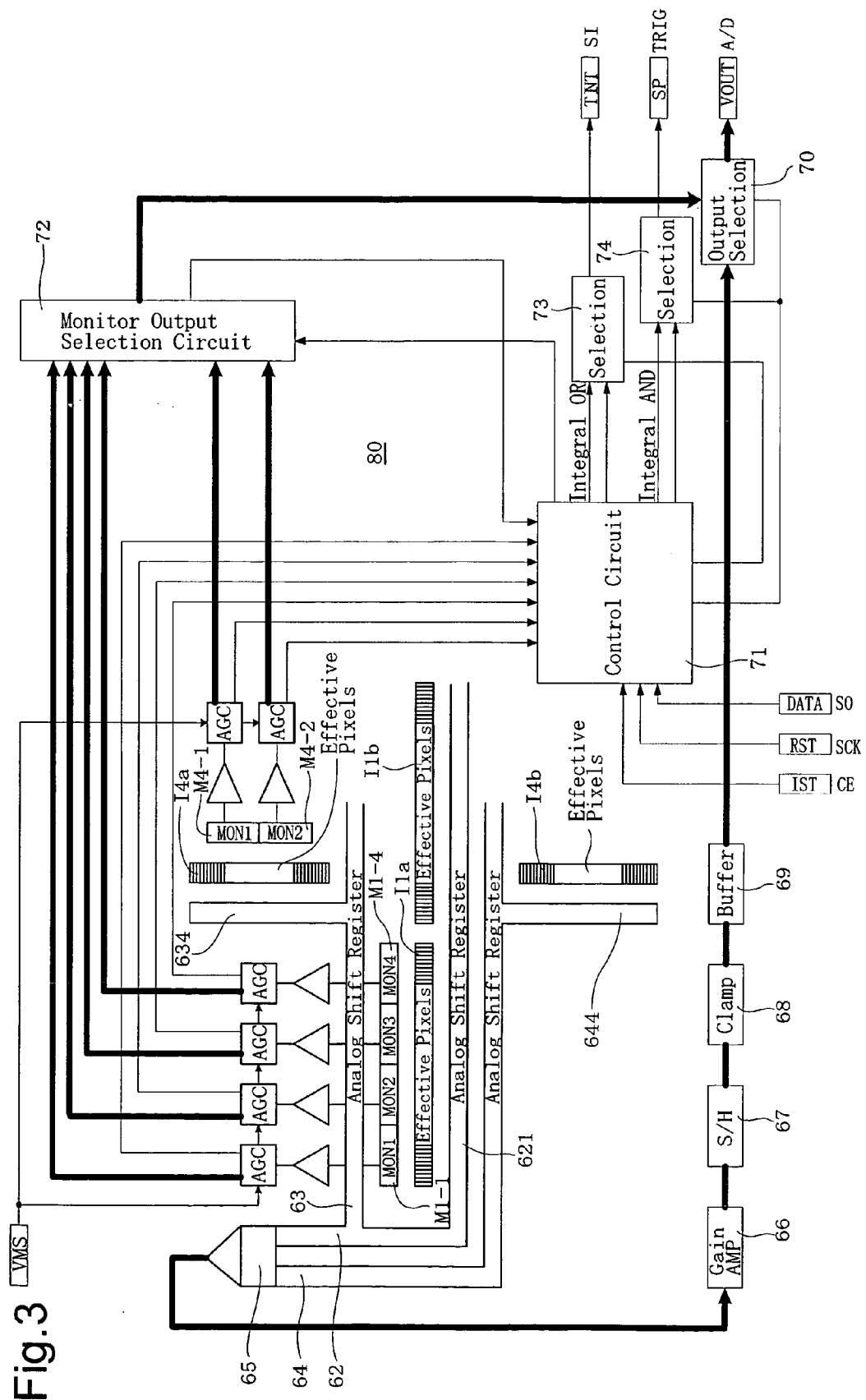
FIG. 3 is a schematic block diagram of elements of a control circuit system on board of a circuit board of the multipoint focus detecting device shown in FIG. 2.

FIG. 3 is a schematic block diagram of elements of a control circuit system which is contained on the circuit board 80 of the CCD focus detection element 61. The operation of the CCD focus detection element 61 is controlled by the control circuit 71 mounted on the circuit board 80. The line sensors I and the monitor sensors M of the CCD focus detection element 61 which are to be used for focusing operation can be selected by the control circuit system of the CCD focus detection element 61. The control circuit 71 operates at a command received via data communications performed between the control circuit 71 and the body CPU 31. In the present embodiment of the CCD focus detection element 61, the operations of the line sensors I and the monitor sensors M which are assigned by a command from the body CPU 31 are selected by the control circuit 71 to be controlled thereby.

The operation of the CCD focus detection element 61 will be discussed hereinafter. The basic operations of the line sensor arrays I1 through I10 are the same while the basic operations of the monitor sensor arrays M1 through M1 are the same, and accordingly, only the operations of the horizontal line sensor arrays I1 (I1-1a through I1-4a and I1-1b through I1-4b) and the associated monitor sensor arrays M (the four monitor sensor arrays M1-1 through M1-4) will be discussed thereinafter.

In commencing integration, the control circuit 71 sweep-drives the horizontal line sensor arrays I1 to sweep electric charge accumulated in each pixel (photodiode) immediately before the commencement of integration to commence integration (electric charge accumulation) in units of pixels. At the same time, the control circuit 71 sweep-drives the four monitor sensor arrays M1-1 through M1-4 to sweep electric charge accumulated in each pixel (photodiode) immediately before the commencement of integration to commence an accumulated-charge monitoring operation by the four monitor sensor arrays M1-1 through M1-4. The output voltage (monitor signal) of each of the four monitor sensor arrays M1-1 through M1-4 is input to an associated auto gain controller AGC via an associated buffer to be used for integral operation termination control. Each auto gain controller AGC outputs the output signal as a monitor signal to a monitor output selection circuit 72, and simultaneously compares this monitor signal with a VMS signal (AGC level/integration termination value) output from the body CPU 31 to output a terminating signal for terminating the integral operation of a line sensor array to the control circuit 71 immediately after the monitor signal corresponding to this line sensor array reaches the integration termination value. Upon receiving the terminating signal, the control circuit 71 terminates the integral operation of the corresponding line sensor array.

The monitor signals output from the auto gain controllers AGC are input to the control circuit 71 and a monitor output selection circuit 72. The control circuit 71 is provided therein with logic devices (e.g., operational amplifiers) each of which serves as a detector for detecting that the associated monitor signal has reached an AGC level (integration termination value), and the control circuit 71 outputs an integration OR signal (first terminating signal) to a port TNT via a selection circuit 73 immediately after the output of any logic device varies. With this integration OR signal output to the port TNT, the body CPU 31 determines that the integral operation of any of the horizontal line sensor arrays I1 has been completed. In the present embodiment, the control circuit 71 changes the level of the integration OR signal that is output to the selection circuit 73 from a high level to a low level when the level of the output of any one of the aforementioned logic devices changes from a high level to a low level. Note that the signal level of the integration OR signal is high at the commencement of the integral operation.

On the aforementioned variation in the output of any logic device, namely, immediately after the associated motor signal has reached the aforementioned AGC level, the control circuit 71 terminates the integral operation of the line sensor array I associated with the monitor sensor M having output the aforementioned motor signal. This process of terminating the integral operation is to terminate the accumulation of electric charges in the ST portion of the corresponding one of the line sensor arrays I1 through I10.

The monitor signals input to the monitor output selection circuit 72 are output to an output selection circuit (switching device) 70 to be output from a port VOUT via the output selection circuit 70.

The body CPU 31 outputs a signal DATA for monitor sensor designation to the CCD focus detection element 61. The control circuit 71 of the CCD focus detection element 61 selects the monitor signals output from the selected monitor sensor arrays M at the monitor output selection circuit 72, and outputs the selected monitor signals to the body CPU 31 as a signal VOUT via the output selection signal 70. At the same time, the control circuit 71 outputs an integral AND signal to a port SP via a selection circuit 74, while the body CPU 31 inputs this integral AND signal from a port TRIG and continues to convert the input monitor signals into digital signals until the signal level of the integral AND signal reaches a level "L".

The body CPU 31 converts the input monitor signal of the monitor sensor M into a digital signal to use the same for use of predicting the integral time and the gain (G) setting.

Upon the commencement of integration, the CCD focus detection element 61 in the preset embodiment of the focus detection system selectively outputs the monitor signals to the output selection circuit 70 so that the output selection circuit 70 outputs the monitor signals as a signal VOUT. Immediately after one of the following two moments comes earlier than the other: the moment at which the monitor signals output from all the designated monitor sensors M reach the AGC level and the moment at which a predetermined period of time (maximum integral time) elapses, namely, upon the completion of integration of all the line sensor arrays I or the forced termination of integration, image signals (video signals V) which are read out of the line sensor arrays I are output as a signal VOUT via the output selection circuit 70.

The control circuit 71 outputs the integral AND signal (second terminating signal) from the port SP via the selection circuit 74 upon detecting that the monitor signals output from all the designated monitor sensors M have reached the AGC level. If the aforementioned predetermined period of time (secondary maximum integral time) elapses before the monitor signals output from all the designated monitor sensors M reach the AGC level (integration termination value), the control circuit 71 forcefully terminates the integral operations of all the line sensor arrays I which correspond to the monitor sensors M whose monitor signals have not yet reached the AGC level, and outputs the integral AND signal=from the port SP to the body CPU 31 via the selection circuit 73.

Upon the completion of all the line sensors arrays I, electric charges are sequentially transferred from the line sensor arrays I1 through I10 to the electric charge detecting element 65 in units of line sensor arrays and in units of pixels thereof via the shift registers 62, 63 and 64 to be converted into voltage signals at the electric charge detecting element 65 to be output to a gain amplifier 66.

After voltage signals in units of electric charge are amplified by the gain amplifier 66, OB voltages are clamped via a sampling/holding circuit 67 and a clamping circuit 68 to be output as signals VOUT (video signals) from the port VOUT via a buffer 69 and the output selection circuit 70. The body CPU 31 inputs the video signals VOUT from a port A/D to the A/D converter 31*e*. The body CPU 31 converts the input video signals VOUT into digital video signals in units of pixels at the A/D converter 31*e* and stores the digital video signals in the RAM 31*b* in sequence.

Although the above descried monitoring, integrating and reading processes can be performed on all the monitor sensor arrays M and the line sensor arrays I, the monitor sensor arrays M and the line sensor arrays I which are to be activated can be freely selected and combined (in select mode). Namely, the above descried monitoring, integrating and reading processes can be performed only on the line sensor arrays I and the monitor sensor arrays M which are selected in select mode. Moreover, the above descried monitoring, integrating and reading processes can be performed only on the line sensor array (or arrays) I and the monitor sensor array (or arrays) M which are feely selected from among the line sensor arrays I and the monitor sensor arrays M which are selected in select mode.

Figure 4:
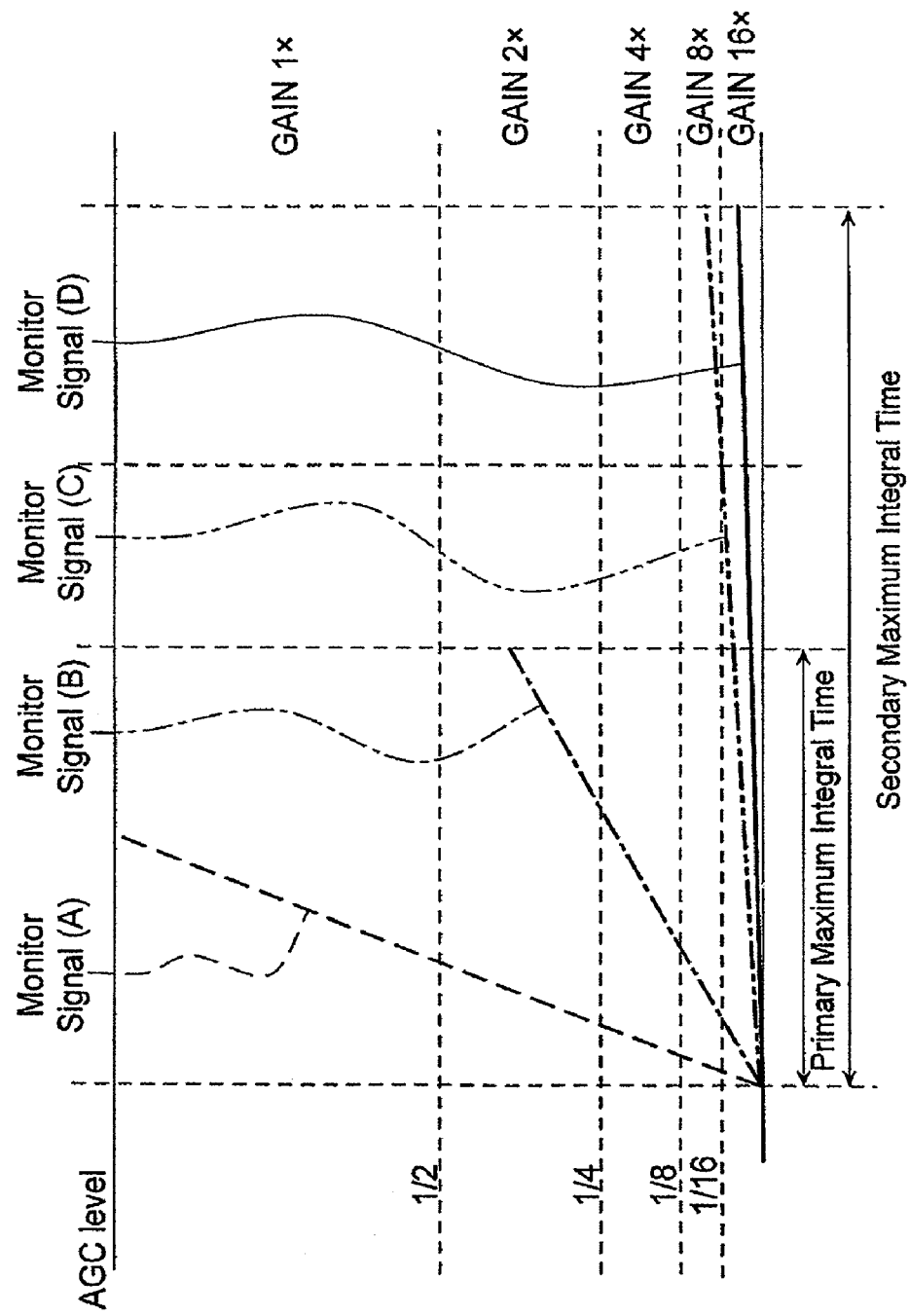
FIG. 4 is a graph showing the relationship among the monitor signal of the multipoint focus detection device incorporated in the single-lens reflex camera system shown in FIG. 1, AGC level and gain.

FIG. 4 shows a graph showing the relationship between the monitor signal of the CCD focus detection element 61, the AGC level, and the gain. The monitor signal (the level of the monitor signal) increases substantially in proportion to the time from the commencement of integral operation. In this particular embodiment, a monitor signal (A) reaches the AGC level before a primary maximum integral time elapses in the case where object brightness is high.

In the case where the monitor signal does not reach the AGC level even after a lapse of the primary maximum integral time, the AGC level is reduced in half. In the case where the monitor signal does not yet reach the reduced AGC level even after a lapse of the primary maximum integral time, a process of doubling the gain G and reducing the AGC level in half is repeated until the monitor signal reaches the AGC level and until the gain G reaches the maximum gain G, whereby a monitor signal (B) reaches the AGC level which is a quarter of the initial AGC level.

Moreover, in the case where the level of the monitor signal is below the AGC level which is one sixteenth of the initial AGC level at a lapse of the primary maximum integral time (in the case of the monitor signals (C) and (D)), the integral operation is allowed to continue being performed until the secondary maximum integral time, which correspond to double the primary maximum integral time, to wait for the secondary maximum integral time to elapse, and subsequently the integral operation is terminated immediately after the secondary maximum integral time elapses. The monitor signal (D) does not reach one sixteenth of the AGC level even upon a lapse of the secondary maximum integral time. Thereafter, it is checked whether or not the monitor signal has reached the AGC level while the aforementioned operation of doubling the gain G and reducing the AGC level in half is repeated, and the gain G is set immediately after the monitor signal reaches the AGC level. However, the maximum gain G is predetermined to be octuple the initial gain G in the present embodiment. In this case, if the AGC level is set to one sixteenth of the initial AGC level ($1/2^4$ times), the maximum gain G is octupled ($2^{n-1}$ times) the initial gain G, i.e., the maximum gain G is multiplied by a factor one step lower. Accordingly, the maximum gain G can be set lower than that when the integral operation is terminated after a lapse of the primary maximum integral time, which makes it possible to prevent noise which may be caused by the amplification of the image signal from increasing.

The above described process makes it possible to reduce the time for the integral process because an appropriate image signal can be obtained without performing the integral process again even in the case of a low object brightness.

Figure 5:
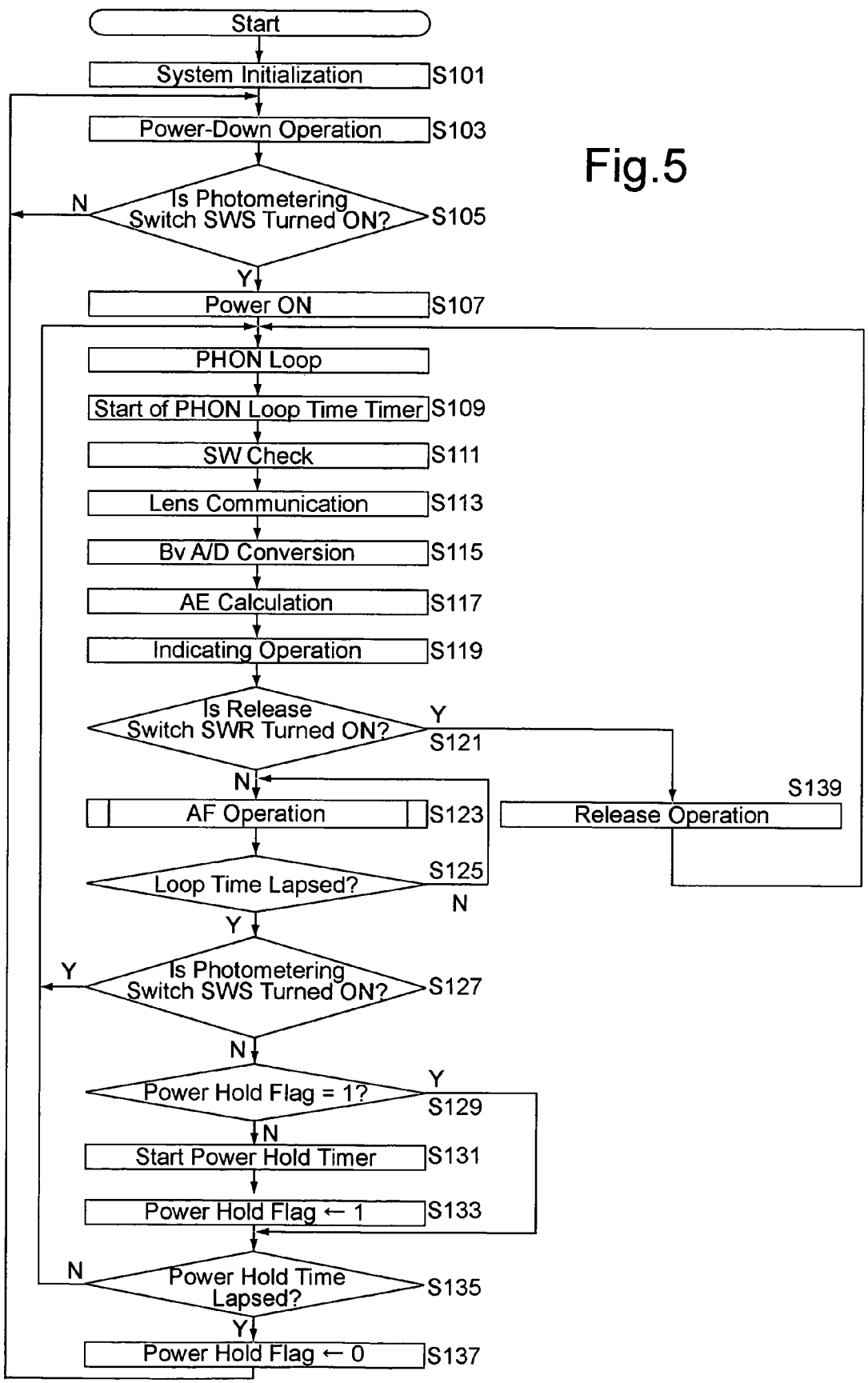
FIG. 5 is a flow chart showing a main process performed in the camera system shown in FIG. 1.
Figure 6:
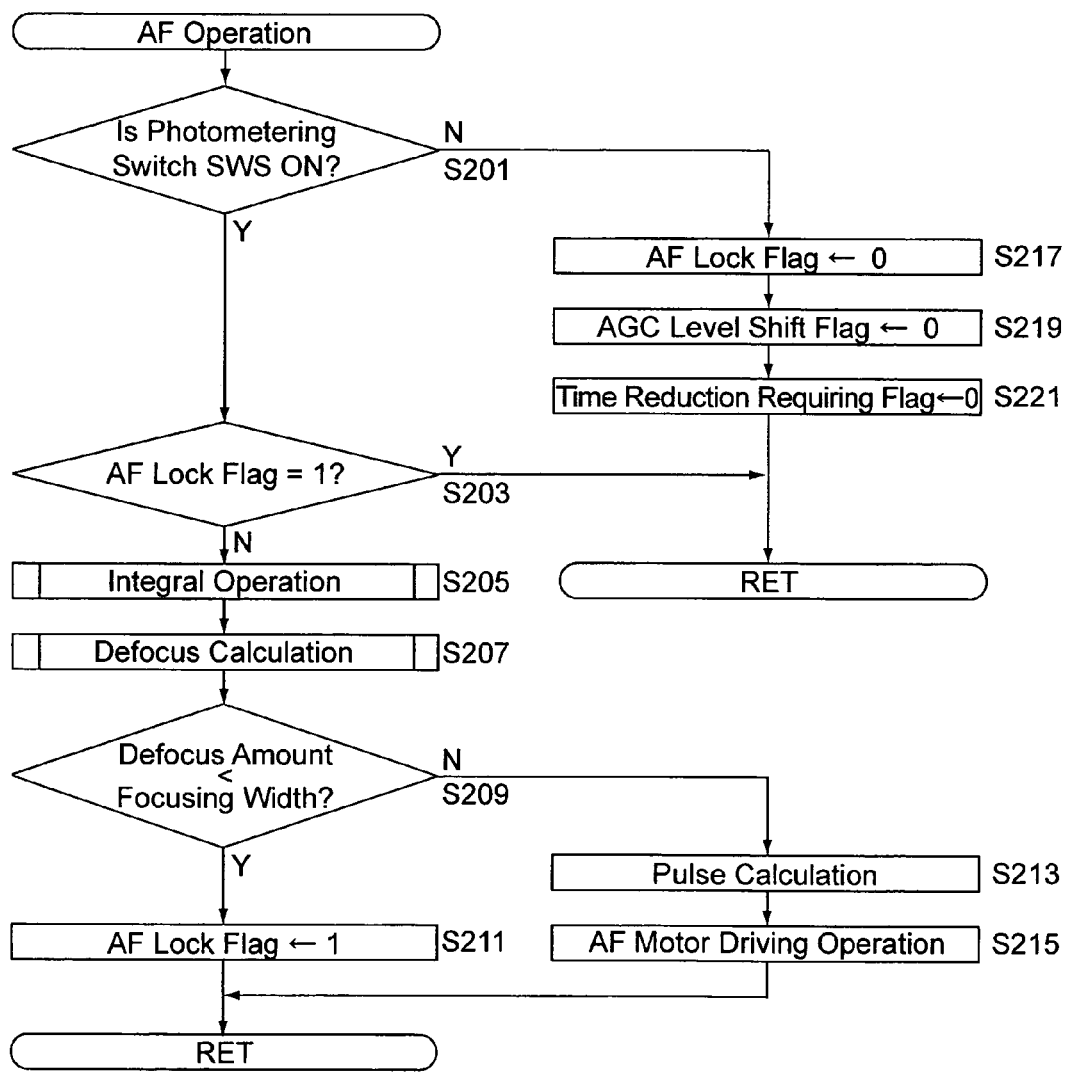
FIG. 6 is a flow chart showing an embodiment of an AF process performed in the main process shown in FIG. 5.

The automatic focus detection and the focusing operation of the AF single-lens reflex camera of the illustrated embodiment will be discussed below with reference to the flow charts shown in FIGS. 5 through 7. When a battery (not shown) is loaded in the camera body 11 and the main switch SWM is turned ON, control enters the routine shown in FIG. 5. The body CPU 31 performs the initialization of the system to generally control the camera operation at step S101. The system initialization includes starting the operation of the body CPU 31, reading the micro program from the ROM 31*a*, and initializing the cache, the input/output port and flags, etc. Thereafter, the operations from step S103 to step S139 are carried out while a predetermined value of voltage is applied from the battery.

Firstly, a power-down operation is performed to stop power supply to all components other than the body CPU 31 (step S103). Thereafter, whether or not the photometering switch SWS is turned ON is checked (step S105). If the photometering switch is not ON (step S105, N), the power-down operation is carried out (step S103), and the power-down state is maintained. If the photometering switch SWS is turned ON (step S105, Y), the power supply is turned ON (step S107), and control enters the PHON loop. The power-on operation (step S107) is carried out to supply the battery power to all the members including the body CPU 31. As a result, the photographing mode is indicated in, for example, the display panel 39.

<PHON Loop>

In the PHON loop, the PHON loop time timer is started (step S109). The PHON loop time corresponds to an interval at which mainly the AF operations are repeated. Thereafter, the switch checking operation is performed, i.e., the state of each switch is input and the lens communication is carried out to obtain lens data from the photographing lens 51 (step S113).

The object brightness signal Bv obtained by the photometering IC 18 is input from the peripheral control circuit 21 and is A/D-converted (step S115), and an AE calculation operation is carried out by an algorithm corresponding to the selected exposure mode (step S117) to determine the shutter speed and the diaphragm value, which are indicated in the display panel 39 (step S119).

Thereafter, whether or not the release switch SWR is turned ON is checked (step S121). If the release switch SWR is ON (step S121, Y), the release operation is performed (step S139), and control returns to the operation of the PHON loop. If the release switch SWR is not ON (step S121, N), the AF operations are repeated until the loop time lapses (step S123; S125, N). When the loop time has lapsed (step S125, Y), it is determined whether or not the photometering switch SWS is turned ON (step S127). If the photometering switch SWS is ON (step S127, Y), control returns to the first step of the PHON loop.

If the photometering switch SWS is not turned ON (step S127, N), it is determined whether or not the power hold flag is "1" (step S129). If the power hold flag is not "1", the power hold timer is started (step S131), the power hold flag is set to "1" (step S133), and control proceeds to step S135. If the power hold flag is "1" (step S129, Y), control skips steps S131 and S133 and proceeds to step S135.

At step S135, it is determined whether the power hold time has lapsed. If the power hold time has lapsed (step S135, Y), the power hold flag is set to "0" (step S137), and control returns to step S103. If the power hold time has not lapsed (step S135, N), control directly returns to the first step of the PHON loop. In other words, the operations from step S109 to step S135 are repeated until the power hold time, from when the photometering switch SWS is turned OFF, lapses. If the power hold time has lapsed after the photometering switch SWS has been turned OFF, the power hold flag is set to "0", and control returns to step S103 to carry out the power-down operation. In the power-down state, no operation is carried out until the photometering switch SWS is turned ON (step S105).

The AF operation at step S215 will be explained below with reference to the flow chart shown in FIG. 6. In the AF operation routine, it is determined whether or not the photometering switch SWS is turned ON (step S201). If the photometering switch SWS is OFF (step S201, N), the AF lock flag, the AGC level shift flag and the time reduction requirement flag are all set to "0" (steps S217, S219, S221). Thereafter, control returns (RET).

If the photometering switch SWS is ON (step S201, Y), it is determined whether or not the AF lock flag is "1" (step S203). The AF lock flag is set to "1" to maintain an in-focus state when the optical system is focused in a one-shot AF mode.

If the AF lock flag is not "1" (step S203, N), the CCD focus detection element 61 performs an integral process (step S205) and the video signal V is input from the CCD focus detection element 61 to carry out the defocus calculation operation (step S207). Thereafter, it is determined whether or not the calculated defocus amount (absolute value) is within a focusing width (step S209). The focusing width refers to a range of the defocus amount in which the focus state can be considered "in-focus" in view of the depth of focus. The focusing width can be defined by a constant value or can be set by calculation based on the focal length the open diaphragm value input from the photographing lens.

If the defocus amount is not within the focusing width (step S209, N), the number of pulses necessary to drive the AF motor 33 is calculated in accordance with the defocus amount (step S213), and the AF motor is driven (step S215) and control returns (RET).

If the defocus amount is within the focusing width (step S209, Y), the AF lock flag is set to "1" (step S211), and control returns (RET). Once the AF lock flag is set to "1", control returns from S203 if control re-enters the AF operation routine.

[Integral Process]

The integral process that is performed at step S205 will be discussed below with reference to the flow chart shown in FIG. 7. In the integral process, firstly an AGC (auto gain control) level is set to an initial value thereof (step S301). The initial value of the AGC level is a maximum value thereof. Subsequently, the primary maximum integral value is set (step S303), and the secondary maximum integral value is set (step S305). In this particular embodiment, the secondary maximum integral value is double the primary maximum integral value. Thereafter, the body CPU 31 carries out an integration start communication with the CCD focus detection element 61 to make the CCD focus detection element 61 start performing integration (step S307).

Upon the commencement of integration, it is checked whether or not the integral operation of any one of the line sensor arrays is completed, i.e., whether or not the output level of any monitor sensor array has reached the integration termination value (AGC level) to output an integration OR signal (step S309). If the integration OR signal has not been output (S309, N), the integration time is stored in memory on each line sensor array (step S311), and it is checked whether or not the primary maximum integral time has elapsed (step S319). If the primary maximum integral time has not elapsed (step S319, N), the input monitor signal is A/D converted (S321), and it is checked whether or not the integral operations of all the line sensor arrays are completed (whether the monitor signals output from all the designated monitor sensors M have reached the AGC level) (step S335). If the integral operations of all the line sensor arrays are not yet completed (step S335, N), control returns to step S309.

If the integration OR signal has been output (if the output level of any monitor sensor array has reached the AGC level) (S309, Y), an integration completion information communication is carried out (step S313), and it is checked whether or not any line sensor array is undergoing an integral operation (step S315). If a line sensor array is undergoing an integral operation (step S315, Y), the integral time of the line sensor array under integral operation is stored in memory (step S317), and control proceeds to step S319. If none of the line sensor arrays are undergoing an integral operation (step S315, N), control simply proceeds to step S319.

[The Case Where the Primary Maximum Integral Time Elapses]

When the primary maximum integral time elapses (step S319, Y; each of the monitor signals (B) (C) and (D) shown in FIG. 4 corresponds to this case), it is checked whether or not an A/D converted value of the monitor signal is less than one sixteenth of the initial AGC level (step S323).

[The Case where AGC Level is under 1/16]

If the A/D converted value of the monitor signal is less than one sixteenth of the initial AGC level (step S323, Y; each of the monitor signal (C) and (D) shown in FIG. 4 corresponds to this case), a flag Fint2 is set to "1" (step S324), and it is checked whether or not the second maximum integral time has elapsed (step S326). The flag Fint2 is set to "1" when the monitor signal which is output when the maximum integral time is the primary maximum integral time is less than one sixteenth of the initial AGC level. If the secondary maximum integral time has not elapsed (step S326, N), control proceeds to step S335 at which it is checked whether or not the integral operation has been completed (step S335). If the integral operation has not yet completed (step S335, N), control returns to step S309, and the operations at steps S309 through S326 (S326, N) and S335 are repeated. Namely, if the A/D converted value of the monitor signal is less than one sixteenth of the initial AGC level at a lapse of the primary maximum integral time, the integral time is extended to the secondary maximum integral time. Thereafter, during the time the A/D converted value of the monitor signal remains less than one sixteenth of the initial AGC level, the operations at steps S309 through S319 (S319, Y), S323 (S323, Y), S324, S326 (S326, N) and S335 (S335, N) are repeated.

Upon the A/D converted value of the monitor signal becoming equal to or greater than one sixteenth of the initial AGC level after a lapse of the primary maximum integral time (S323, N; this case corresponds to the monitor signal (C)), it is checked whether or not the flag Fint2 is "1" (step S325). At this time, the flag Fint2 is "1" (step S325, Y), and accordingly control returns to step S326 to repeat the integral operation. Namely, in the case where the A/D converted value of the monitor signal is less than one sixteenth of the initial AGC level at a lapse of the primary maximum integral time, the integral operation normally continues being performed until the secondary maximum integral time elapses. If the object brightness suddenly increases to a degree that the A/D converted value of the monitor signal exceeds the AGC level after a lapse of the first maximum integral time, the integral operation is completed at step S335, so that control proceeds to step S337.

Immediately after the secondary maximum integral time elapses (step S326, Y), the AGC level is set to a half of the previous AGC level (step S327), and it is checked whether or not the integral operation has been completed (whether or not the A/D converted value of the monitor signal has reached the AGC level)(step S329). If the integral operation has not been completed (S329, N), the gain G is set to double the previous gain G (step S331), and it is checked whether or not the gain G has become the maximum gain G (eight times the initial gain G) (step S333). If the gain G has not become the maximum gain G (S333, N), control returns to step S327 to repeat an AGC-level lowering process consisting of the operations at steps S327 through S333. Thereafter, if the integral operation has been completed (if the A/D converted value of the monitor signal has reached the AGC level)(S329, Y), control proceeds to step S337. In the case of the monitor signal (C), control proceeds to step S337 if the AGC level is one eighth of the initial AGC level and if the gain G is four times the initial gain G. Even if the integral operation has not been completed (S329, N), control also proceeds to step S337 if the gain G has become the maximum gain G (eight times of the initial gain G) (S333, Y). In the case of the monitor signal (D), control proceeds to step S337 if the gain G has become the maximum gain G (eight times of the initial gain G) (S333, Y).

[Not the Case where AGC Level is under 1/16]

If the A/D converted value of the monitor signal is not less than one sixteenth of the initial AGC level (step S323, N; the monitor signal (B) shown in FIG. 4 corresponds to this case), it is checked whether or not the flag Fint2 is set to "1" (step S325). At this time, the flag Fint2 is not "1" (step S325, N), so that control skips the operation at step S326 and proceeds to step S327. Subsequently, the AGC level is set to a half of the previous AGC level (step S327) and it is checked whether or not the integral operation has been completed (whether or not the A/D converted value of the monitor signal has reached the AGC level)(step S329). If the integral operation has not been completed (S329, N), the gain G is set to double the previous gain G (step S331), and it is checked whether or not the gain G has become the maximum gain G (eight times of the initial gain G) (step S333). If the gain G has not become the maximum gain G (S333; N), control returns to step S327 to repeat the operations at steps S327 through S333. Thereafter, if the integral operation has been completed (if the A/D converted value of the monitor signal has reached the AGC level) (S329, Y), control proceeds to step S337. Even if the integral operation has not been completed (S329, N), control proceeds to step S337 if the gain G has become the maximum gain G (eight times of the initial gain G) (S333, Y).

At step S337, the body CPU 31 carries out an integration termination communication with the CCD focus detection element 61 to make the CCD focus detection element 61 stop performing the integral process. Even if control proceeds from step S333 to step S337 upon the gain G becoming the maximum gain G (eight times of the initial gain G), the integral operation is terminated by this integration termination communication. Thereafter the video signals (image signals) V amplified with the set gain G are input from the CCD focus detection element. 61 to be converted into digital signals (step S339), a defocus amount calculating operation is carried out on each video signal V (step S341), and control returns (RET).

As can be understood from the above description, according to the present embodiment of the focus detection system, an insufficient gain can be compensated for by an extension of the integral time of an integral operation after a lapse of the primary maximum integral time even in dark conditions because the integral operation is not commenced again and it is checked whether the monitor signal level is below one sixteenth of the initial AGC level if the integral operation has not been completed even after a lapse of the primary maximum integral time after the commencement of the integral operation, the integral time is extended to the second maximum integral time of the integral operation if the monitor signal level is below one sixteenth of the initial AGC level, it is checked whether the integral operation has been completed while the AGC level is reduced in stages (by one half each time) immediately after the secondary maximum integral time elapses, and a process of increasing the gain G in stages (by two each time) is repeated if it is determined that the integral operation has not been completed. The integral operation can be terminated without delay by setting an adequate gain G. Since an adequate gain G is set, the level of amplified video signals V reaches an appropriate level, which makes it possible to obtain correct defocus amount.

Figure 7:
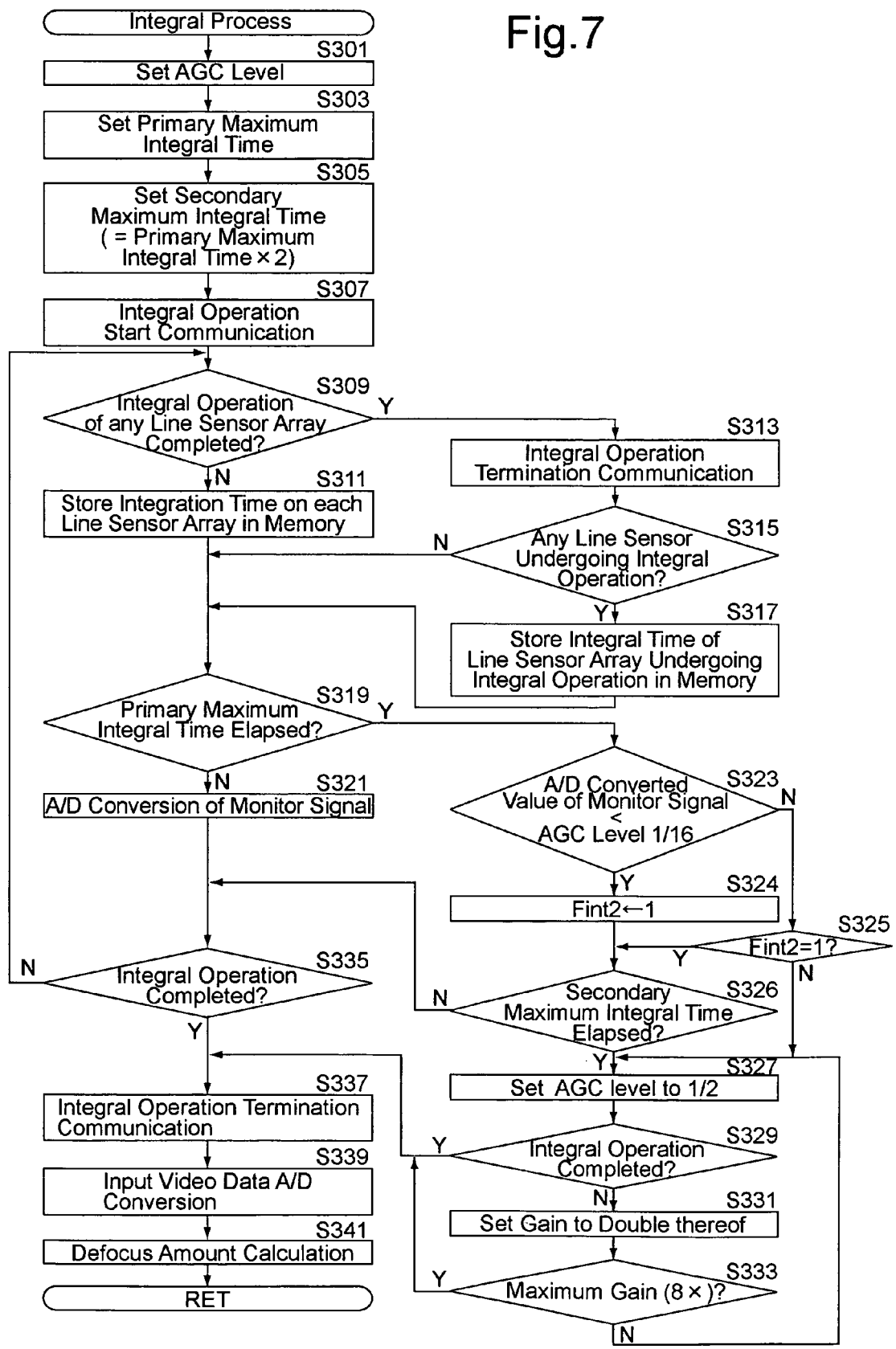
FIG. 7 is a flow chart showing an embodiment of an integral process performed in the AF process shown in FIG. 6.

The integral process shown in FIG. 7 is repeated on each line sensor array (I1 through I10) and the associated monitor sensor array (M1 through M10) on each of the plurality of focus detection zones, and appropriate video signals V can be obtained on each focus detection zone by amplifying the image signal by the gain amplifier 66 with the gain G set at each focus detection zone.

The maximum gain G is predetermined to be eight times of the initial gain G in the present embodiment, but is not limited solely to the octuple gain G, i.e., the maximum gain G can be more or less than the octuple gain G. Moreover, the gain G can be increased stepwise by ³⁄₂ times (or decreased by ²⁄₃ times), instead of being increased stepwise by two times (or decreased by ½ times) in the above described embodiment.

Figure 8:
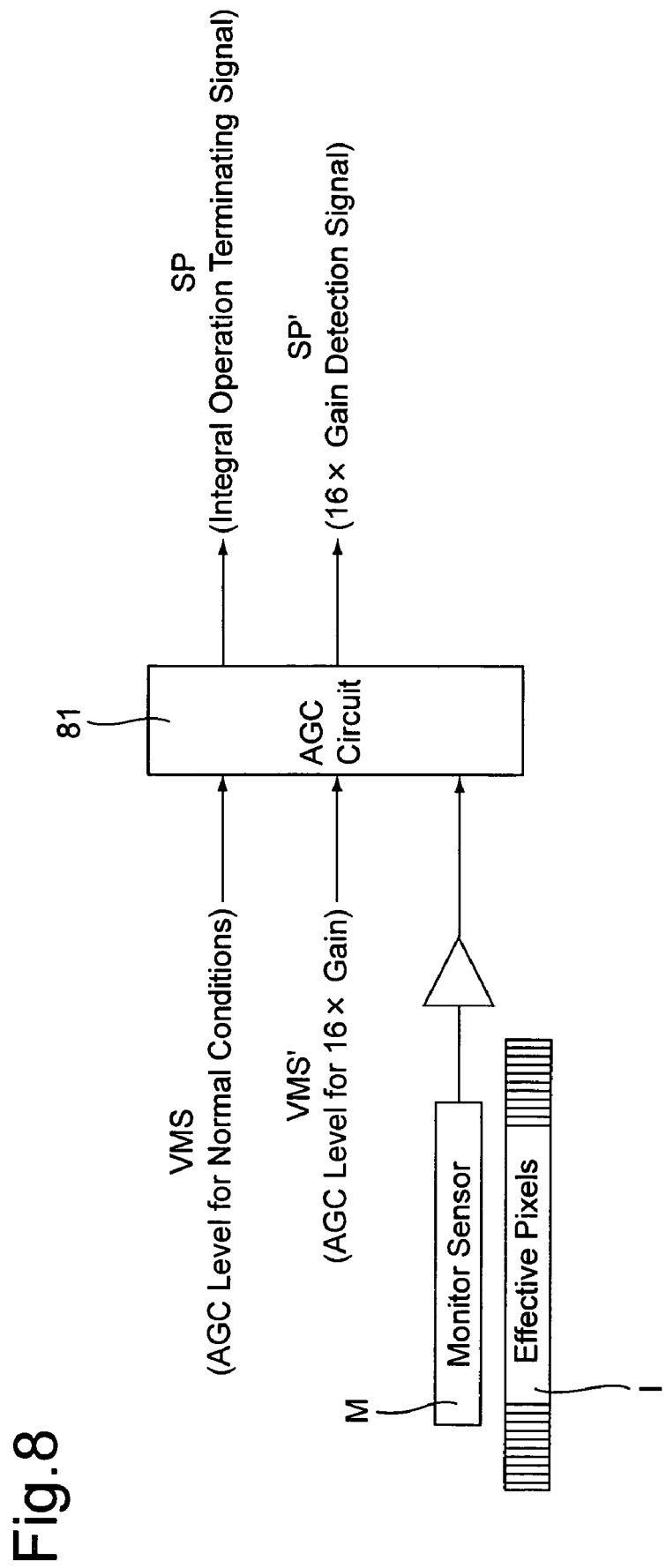
FIG. 8 is a schematic block diagram showing a monitor sensor array, a line sensor array and an AGC circuit in a second embodiment of the multipoint focus detection device.

FIG. 8 is a schematic block diagram showing a monitor sensor array M, a line sensor array I and an AGC circuit 81 in a second embodiment of the multipoint focus detection device according to the present invention, and FIG. 9 is a graph showing the relationship between the monitor signal, the AGC level and gain G in the second embodiment of the multipoint focus detection device. The second embodiment of the multipoint focus detection device is characterized by the AGC circuit 81 determining that the monitor signal (determined at step S323 from the A/D converted value of the image signal in the above illustrated embodiment of the multipoint focus detection device) does not reach the AGC level which is sixteen times the gain G, which serves as an integral operation termination value for dark conditions, before a lapse of the primary maximum integral time, and thereafter the monitor signal is output to the control circuit 71 so that the integral time is extended to the secondary maximum integral time.

In the second embodiment of the multipoint focus detection device, an AGC level (normal AGC level) for normal conditions and a ¹⁄₁₆ AGC level (one sixteenth of the normal AGC level) used when the gain G is increased up to the maximum (sixteen times) are input to the AGC circuit 81 that is provided on each monitor sensor array M. The AGC circuit 81 compares the monitor signal input from the associated monitor sensor array M with each of the normal AGC level and the ¹⁄₁₆ AGC level, and outputs an integral operation terminating signal SP to the control circuit 71 upon detecting that the input monitor signal reaches the normal AGC level, and outputs a 16-times Gain detection signal SP′ to the control circuit 71 upon detecting that the input monitor signal reaches the ¹⁄₁₆ AGC level.

In the case where the monitor signal has not reached the ¹⁄₁₆ AGC level after a lapse of the primary maximum integral time, namely in the case where either the integral operation terminating signal SP or the 16-times Gain detection signal SP′ has not been output from the AGC circuit 81, the body CPU 31 extends the maximum integral time to the secondary maximum integral time, which is double the primary maximum integral time, to set the gain G of the gain amplifier 66 to sixteen times the initial gain G. Thereafter, control waits for the 16-times Gain detection signal SP′ to be output from the AGC circuit 81.

As can be understood from the foregoing, according to the second embodiment of the multipoint focus detection device, a proper defocus amount can be obtained in a short amount of time even in the case of a low brightness object, because the integral time is extended so that the integral operation continues to be performed if it is determined at a lapse of the primary maximum integral time that setting a gain which exceeds the maximum gain G is necessary.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A focus detection system comprising:
  at least one line sensor array having a plurality of areas, each of which includes a plurality of pixels, wherein said line sensor array photoelectrically converts object light received by each of said plurality of pixels into an electric charge to accumulate said electric charge, and outputs said accumulated electric charge as an image signal;
  at least one monitor sensor array, positioned adjacent to said line sensor array, for monitoring an integral value of said line sensor array so as to output a monitor signal;
  a controller which terminates an integral operation of said line sensor array one of immediately after said monitor signal reaches a predetermined integration termination value and immediately after a lapse of a predetermined maximum integral time, whichever occurs first; and
  an amplifier which amplifies said image signal at an amplification factor determined in accordance with said monitor signal at said termination of said integral operation,
  wherein said controller detects said integral value of said line sensor array from said monitor signal output from said monitor sensor array during a monitoring operation thereof, continues to make said line sensor array perform said integral operation until a secondary maximum integral time elapses in the case where said controller determines, upon a lapse of a predetermined primary maximum integral time, that a value of said monitor signal is necessary to be amplified at an amplification factor greater than a maximum amplification factor of said amplifier, and increases said amplification factor of said amplifier after a lapse of said secondary maximum integral time, said secondary maximum integral time being longer than said primary maximum integral time.

2. The focus detection system according to claim 1, wherein said secondary maximum integral time comprises a time for compensating said amplification at said amplification factor which exceeds said maximum amplification factor.

3. The focus detection system according to claim 1, wherein, after said lapse of said secondary maximum integral time, said controller repeats a process of reducing said integration termination value in stages and increasing said amplification factor in stages while comparing said monitor signal with said termination value until one of said value of said monitor signal reaches said integration termination value and said amplification factor becomes said maximum amplification factor to which said amplifier can be set.

4. The focus detection system according to claim 1, wherein said controller extends said maximum integral time to said secondary maximum integral time, which is longer than said primary maximum integral time, when determining that said value of said monitor signal is less than said predetermined integration termination value at a lapse of said primary maximum integral time.

5. The focus detection system according to claim 1, wherein said focus detection system is incorporated in a camera to serve as a component of an autofocus system of said camera.

6. The focus detection system according to claim 5, wherein said camera is an SLR camera.

7. A focus detection system comprising:
  at least one line sensor array having a plurality of areas, each of which includes a plurality of pixels, wherein said line sensor array photoelectrically converts object light received by each of said plurality of pixels into an electric charge to accumulate said electric charge, and outputs said accumulated electric charge as an image signal;
  an amplifier which amplifies said image signal at a predetermined amplification factor;
  at least one monitor sensor array, positioned adjacent to said line sensor array, for monitoring an integral of said line sensor array so as to output a monitor signal; and a controller which terminates an integral operation of said line sensor array one of immediately after said monitor signal reaches a predetermined integration termination value and immediately after a lapse of a predetermined maximum integral time, whichever occurs first;

wherein, in the case where said monitor signal has not reached said integration termination value even after a lapse of said maximum integral time, said controller repeats a process of reducing said integration termination value and increasing said amplification factor until said monitor signal reaches said integration termination value reduced by said process, and terminates said integral operation of said line sensor array when one of said value of said monitor signal reaches said integration termination value and said amplification factor becomes a maximum amplification factor.

8. The focus detection system according to claim 7, wherein said controller increases said maximum integral time to a secondary maximum integral time when said value of said monitor signal upon said lapse of said maximum integral time has not yet reached a second integration termination value which is for darker conditions and is less than said integration termination value, and increases said amplification factor of said amplifier to said maximum amplification factor upon a lapse of said secondary maximum integral time.

9. The focus detection system according to claim 7, wherein said line sensor array and said monitor sensor array are provided on each of a plurality of focus detection zones, and wherein said controller performs said operation on each of said monitor sensor arrays.

10. The focus detection system according to claim 7, wherein said monitor sensor array outputs said monitor signal which is in proportion to said integration of said line sensor array, which is monitored by said monitor sensor array.

11. The focus detection system according to claim 9, further comprising a switching device which selectively outputs said image signal and said monitor signal from a common output terminal, wherein said switching device outputs said monitor signal from said common output terminal one of immediately after all said monitor signals reach said integration termination value and immediately after a lapse of said maximum integral time, whichever occurs first.

12. The focus detection system according to claim 7, wherein said focus detection system is incorporated in a camera to serve as a component of an autofocus system of said camera.

13. The focus detection system according to claim 12, wherein said camera is an SLR camera.

14. A focus detection system comprising:

at least one line sensor array having a plurality of areas, each of which includes a plurality of pixels, wherein said line sensor array photoelectrically converts object light received by each of said plurality of pixels into electric charge to accumulate said electric charge, and outputs said accumulated electric charge as an image signal;

at least one monitor sensor array, positioned adjacent to said line sensor array, for monitoring an integral value of said line sensor array so as to output a monitor signal;

a controller which terminates an integral operation of said line sensor array one of immediately after said monitor signal reaches a predetermined integration termination value and immediately after a lapse of a predetermined maximum integral time, whichever occurs first; and an amplifier which amplifies said image signal at an amplification factor determined in accordance with said monitor signal at said termination of said integral operation, wherein said controller detects said integral value of said line sensor array from said monitor signal output from said monitor sensor array during a monitoring operation thereof, and wherein said controller increases said maximum integral time and changes said amplification factor of said amplifier to a maximum amplification factor thereof in the case wherein said controller determines that, upon a lapse of said maximum integral time, the value of said monitor signal is a value necessary to be amplified at an amplification factor greater than said maximum amplification factor.

15. The focus detection system according to claim 14, wherein said controller compares said predetermined integration termination value with an integration termination value for dark conditions, wherein said controller increases said maximum integral time and changes said amplification factor of said amplifier to said maximum amplification factor when determining that said value of said monitor signal has not yet reached said integration termination value for dark conditions upon said lapse of said maximum integral time.

16. The focus detection system according to claim 14, wherein said focus detection system is incorporated in a camera to serve as a component of an autofocus system of said camera.

17. The focus detection system according to claim 16, wherein said camera is an SLR camera.

18. The focus detection system according to clam 1, said controller being configured to utilize said primary and secondary maximum integral times during a single photoelectric conversion process.

19. The focus detection system according to claim 1, said secondary maximum integral time comprising an extension of said primary maximum integral time.

* * * * *